UNITED STATES PATENT OFFICE 2,665,304

POLYCARBOXYLATES

Tracy M. Patrick, Jr., Dayton, Ohio, assignor to Monsanto Chemical Company, St. Louis, Mo., a corporation of Delaware No Drawing. Application September 25, 1950, Serial No. 186,678

13 Claims. (Cl. 260—483)

The present invention relates to addition products of saturated aliphatic aldehydes with certain esters of itaconic acid. More particularly the invention provides polycarboxylates by reaction of one mole of a lower, saturated aliphatic aldehyde and at least two moles of a dialkyl itaconate.

The preparation of ketones by the free-radial catalyzed addition of one mole of a saturated aliphatic aldehyde to one mole of an ester of an α,β-unsaturated dicarboxylic acid such as a dialkyl maleate is disclosed in the co-pending application of Tracy M. Patrick, Jr., and E. W. Gluesenkamp, Serial No. 138,829, filed December 9, 1949. Now I have found that when the aldehydes are contacted with certain hydrocarbon esters of itaconic acid in the presence of a free-radical-liberating agent, the products are not the ketones which would be expected by a 1:1 addition, but addition products in which one mole of the aldehyde has added to at least two moles, and preferably with from two to 20 moles, of the itaconate, the present reaction proceeding substantially according to the scheme:

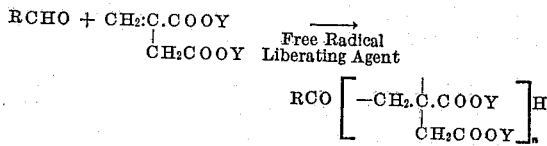

in which R is an alkyl radical of from 1 to 18 carbon atoms, n is an integer of from 2 to 20 and Y is selected from the class consisting of alkyl, cycloalkyl, aryl, aralkyl and alkaryl radicals of from 1 to 18 carbon atoms.

Saturated aldehydes which may be employed for the preparation of the present adducts are, for example, acetaldehyde, propionaldehyde, n-butyraldehyde, isobutyraldehyde, n-valeraldehyde, isovaleraldehyde, methylethylacetaldehyde, trimethylacetaldehyde, n-caproic aldehyde, isohexaldehyde, heptaldehyde, 2-ethylhexaldehyde, octaldehyde, capric aldehyde, undecaldehyde, lauric aldehyde, palmitic aldehyde, stearic aldehyde, etc. Itaconates useful for the present purpose include dimethyl, diethyl, diisopropyl, di-n-butyl, bis (2-ethylhexyl), di-n-octyl, didodecyl, dihexadecyl, octadecyl, diphenyl, di-p-tolyl, bis(β-phenylethyl), di-β-napthyl, dixenyl and dicyclohexyl itaconate.

Free-radical-liberating agents which may be employed in promoting addition of the present aldehydes to the itaconates are compounds which will decompose to give free radicals. Such compounds include peroxygen-type catalysts, for example acyl peroxides, such as acetyl, benzoyl, lauroyl or stearoyl peroxides; hydrocarbon peroxides or hydroperoxides such as di-tert-butyl peroxide, di-tert-amyl peroxide, tert-butyl hydroperoxide, cumene hydroperoxide or p-cymene hydroperoxide; and inorganic per-compounds such as hydrogen peroxide, sodium peroxide, sodium perborate, potassium persulfate, and alkali percarbonates; hydrazine derivatives such as hydrazine hydrochloride and dibenzoyl hydrazine; organometallic compounds such as tetraethyl lead, etc. For convenience, the peroxygen type catalysts will be hereinafter referred to as peroxidic compounds. Only catalytic quantities of the free-radical-liberating agent need be employed in promoting the addition reaction. Quantities of as little as 0.001 per cent to 1.0 per cent, based on the weight of the allyl ester, are generally sufficient to give optimum yields of the polyhalo esters. In order to avoid detrimental side reactions, quantities of more than 5 per cent of the catalyst, based on the weight of the ester component should not be employed. Ultra-violet light may be employed with the catalyst or as the sole catalytic agent.

The addition reaction may be effected simply by contacting the itaconate with the aldehyde in the presence of a free-radical-liberating agent such as a peroxidic compound at ordinary or increased temperature, depending upon the nature of the individual reactants employed. Optimum yields are generally obtained by maintaining the mixture of reactants and catalyst at a temperature which allows steady decomposition of the catalyst.

The formation of low molecular weight versus high molecular weight addition products is a function of reaction conditions as well as of reactant quantities. When employing substantially equimolar quantities of the ester and the aldehyde, formation of the higher ratio products is favored; even when using two or three moles of aldehyde to one mole of ester, the products are adducts of an aldehyde and at least two moles of ester. Optimum reaction conditions for the formation of the various adducts vary with the reactants and catalyst and may be experimentally determined for each desired product.

The present aldehyde-itaconate adducts are viscous, highly stable liquids which are advantageously employed for a variety of industrial purposes. They are generally valuable as softeners for natural rubbers or synthetic rubbers such as the polymers and copolymers of 1,3-butadiene compounds. Particularly useful as rubber softeners are the adducts of the lower aldehydes, e. g.

propionaldehyde or butyraldehyde with from 2 to 4 moles of a lower dialkyl itaconate such as dimethyl or diethyl itaconate. Such adducts decrease the flow-resistance of the rubber and thereby facilitate processing operations such as milling, calendering extruding, molding, etc. The present adducts are also generally useful as plasticizers for synthetic resins and plastics. Especially useful as plasticizers are the adducts of the higher aldehydes, with the higher alkyl esters, e. g., lauric aldehyde with from 2 to 5 moles of bis(2-ethylhexyl) itaconate. Adducts in which from 2 to 8 moles of the ester have combined with one mole of the aldehyde possess very good viscosity characteristics; this together with their pronounced heat-stability and low volatility, recommends them for use as lubricant additives. The adducts of higher ester: aldehyde ratio, i. e. those in which from 10 to 14 moles of ester have combined with one mole of the aldehyde have very good thickening properties and are advantageously employed as cosmetic bases emulsifying agents, etc. The adducts are characterized by outstanding anti-oxidant efficiency, which property not only contributes to their usefulness for the various purposes enumerated above, but also recommends them for use as general antioxidants and preservatives in the food and chemical industries.

The invention is further illustrated, but not limited, by the following example.

*Example*

A mixture consisting of 93.0 g. (0.5 mole) of diethyl itaconate and 108.0 g. (1.5 moles) of n-butyraldehyde was brought to a refluxing temperature and 0.5 g. of benzoyl peroxide was then added. The whole was then refluxed (86° C.) for about 4 hours and an additional 0.5 g. of benzoyl peroxide was added. Refluxing was continued until a total refluxing time of 73.5 hours.

The light yellow solution thus obtained was then distilled to remove material boiling up to 120° C./1.0 mm. (unreacted aldehyde, ester and aldehyde by-products) and there was obtained as residue 106 g. of a very viscous yellow liquid, $n_D^{25}$ 1.4623, M. W. 595 (cryoscopic determination in benzene), and analyzing 58.85% C. and 7.96% H. These observed constants and the analysis correspond to a 2.7:1 diethyl itaconate: butyraldehyde adduct.

The adduct was found to confer improved properties to polyvinyl chloride and was completely compatible with the polymer in quantities of up to 40 parts of adduct to 60 parts of polyvinyl chloride. When tested as a lubricant additive it contributed increased viscosity to the lubricant over a wide temperature range.

Operating as in the above example, other saturated aliphatic aldehydes, e. g., propionaldehyde, 2-ethylhexaldehyde or lauric aldehyde may be similarly reacted with diethyl itaconate or other dialkyl, dicycloalkyl, diaryl, diaralkyl or dialkaryl itaconates to give addition products in which one mole of the aldehyde has added to at least two moles of the ester. Also, instead of employing benzoyl peroxide as catalyst, other peroxidic compounds of free-radical-liberating agents may be used to catalyze the addition reaction.

The present adducts differ essentially from polymeric materials previously obtained from unsaturated esters or from polymeric acetals previously prepared by reaction of hydrolyzed polymeric esters with aldehydes in that they are low molecular weight materials, i. e., the average molecular weight of the products is generally less than 1,000; in that they are viscous liquids rather than solid or semi-solid materials, and in that they can be subjected to heat and/or polymerizing catalysts without undergoing further polymerization or substantial modification of physical or chemical properties. Thus, while low molecular weight polymeric vinyl esters are readily converted to high molecular weight solid resins or plastics the present addition products resist any similar conversion. Formation of the present adducts probably proceeds through a chain mechanism, with termination of the chain at an early stage, i. e., at a point at which no more than 20 moles of the ester have added to one mole of the aldehyde. Depending upon the nature and quantity of reactants and free-radical-liberating agent, as well as upon the reaction conditions, chain propagation may be terminated at various stages to yield products in which from 2 to 20 moles of the ester have added to one mole of the aldehyde.

What I claim is:

1. An adduct of at least one mole of an aldehyde with at least 2 moles of an itaconate, said adduct having the general formula

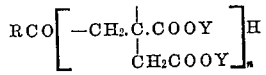

in which R is an alkyl radical of from 1 to 18 carbon atoms, Y is a hydrocarbon radical which is free of non-benzenoid unsaturation and which contains from 1 to 18 carbon atoms, and $n$ is an integer of from 2 to 20.

2. Addition products of 1 mole of a saturated aliphatic aldehyde having from 1 to 18 carbon atoms and at least 2 moles of a dialkyl itaconate in which the alkyl radical has from 1 to 18 carbon atoms.

3. An adduct of n-butyraldehyde with diethyl itaconate in which 1 mole of aldehyde has combined with from 2 to 20 moles of the itaconate.

4. An addition product of n-butyraldehyde and diethyl itaconate in which an average of 2.7 moles of the itaconate has added to one mole of the aldehyde.

5. The method of preparing adducts which comprises contacting, in the presence of a free-radical-liberating agent, a saturated aliphatic aldehyde of from 2 to 18 carbon atoms with an itaconate having the general formula

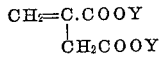

in which Y is a hydrocarbon radical which is free of non-benzenoid unsaturation and which contains from 1 to 18 carbon atoms and recovering from the resulting reaction product adducts having the general formula

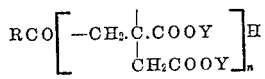

in which R is an alkyl radical of from 1 to 18 carbon atoms, Y is a hydrocarbon radical which is free of non-benzenoid unsaturation and which contains from 1 to 18 carbon atoms, and $n$ is an integer of from 2 to 20.

6. The method claimed in claim 5 further defined in that the free-radical-liberating agent is a peroxidic compound.

7. The method claimed in claim 5 further defined in that the free-radical-liberating agent is benzoyl peroxide.

8. The method of preparing addition products having the general formula

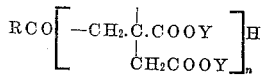

in which R and Y are alkyl radicals of from 1 to 18 carbon atoms and $n$ is an integer of from 2 to 20, which comprises contacting, in the presence of a free-radical-liberating agent, a saturated aliphatic aldehyde of from 2 to 18 carbon atoms with a dialkyl itaconate in which each alkyl radical has from 1 to 18 carbon atoms.

9. The method defined in claim 8 further defined in that the free-radical-liberating agent is a peroxidic compound.

10. The method claimed in claim 8 further defined in that the free-radical-liberating agent is benzoyl peroxide.

11. The method which comprises contacting, in the presence of a free-radical-liberating agent, n-butyraldehyde with a dialkyl itaconate in which each alkyl radical has from 1 to 18 carbon atoms and recovering from the resulting reaction product adducts in which 1 mole of the aldehyde has added to at least 2, but not more than 20, moles of the itaconate.

12. The method claimed in claim 11, further defined in that the free radical liberating agent is benzoyl peroxide.

13. The method which comprises contacting n-butyraldehyde with dialkyl itaconate in the presence of benzoyl peroxide and recovering from the resulting reaction product an adduct in which 1 mole of the aldehyde has added to an average of 2.7 moles of the itaconate.

TRACY M. PATRICK, Jr.

No references cited.